US012679738B2

(12) United States Patent
Kharas

(10) Patent No.: US 12,679,738 B2
(45) Date of Patent: Jul. 14, 2026

(54) STRONTIUM-CATALYZED BOEHMITE FORMATION

(71) Applicant: BASF CORPORATION, Florham Park, NJ (US)

(72) Inventor: Karl C. Kharas, Iselin, NJ (US)

(73) Assignee: BASF CORPORATION, Florham Park, NJ (US)

( * ) Notice: Subject to any disclaimer, the term of this patent is extended or adjusted under 35 U.S.C. 154(b) by 686 days.

(21) Appl. No.: 18/015,773

(22) PCT Filed: Jun. 25, 2021

(86) PCT No.: PCT/US2021/039056
§ 371 (c)(1),
(2) Date: Jan. 12, 2023

(87) PCT Pub. No.: WO2022/015484
PCT Pub. Date: Jan. 20, 2022

(65) Prior Publication Data
US 2023/0271844 A1 Aug. 31, 2023

Related U.S. Application Data

(60) Provisional application No. 63/051,461, filed on Jul. 14, 2020.

(51) Int. Cl.
*C01F 7/08* (2022.01)
*B01J 23/02* (2006.01)

(52) U.S. Cl.
CPC ................. *C01F 7/08* (2013.01); *B01J 23/02* (2013.01)

(58) Field of Classification Search
None
See application file for complete search history.

(56) References Cited

U.S. PATENT DOCUMENTS

| | | |
|---|---|---|
| 2016/0008791 A1 | 1/2016 | Schunk et al. |
| 2020/0078774 A1 | 3/2020 | Wei et al. |
| 2020/0157434 A1* | 5/2020 | Kharas ................... C10G 11/05 |

FOREIGN PATENT DOCUMENTS

| | | |
|---|---|---|
| WO | 2018/191647 A1 | 10/2018 |
| WO | 2021005241 A1 | 1/2021 |

OTHER PUBLICATIONS

Barrow, N. S., et al., Surface Selective 1H and 27AI MAS NMR Observations of Strontium Oxide Doped y-Alumina, Johnston Matthey Technol. Rev., 2016, 60, (2), 90-97 (Year: 2016).*
International Search Report and Written Opinion for PCT/US2021/039056 mailed Oct. 14, 2021, 9 pages.
1 European Search Report for EP Patent Application No. 21841394.6, Issued on Jan. 22, 2025, 3 pages.

* cited by examiner

*Primary Examiner* — Guinever S Gregorio
(74) *Attorney, Agent, or Firm* — Peter DiMauro

(57) ABSTRACT

A strontium-catalyzed process for preparing boehmite includes combining a strontium material, flash calcined gibbsite, and water to obtain an aqueous suspension; contacting the aqueous suspension with a water-soluble carbonate material; and heating the aqueous suspension to a temperature, and for a time, sufficient to form at least about 5 wt. % of boehmite.

10 Claims, 3 Drawing Sheets

Fig 1a

STRONTIUM-CATALYZED BOEHMITE FORMATION

CROSS-REFERENCE TO RELATED APPLICATIONS

This application is a national phase entry under 35 U.S.C. § 371 of International Application No. PCT/US2021/039056, filed on Jun. 25, 2021, which claims priority U.S. Provisional Patent Application No. 63/051,461, filed on Jul. 14, 2020. The contents of these applications are hereby incorporated by reference herein in their entirety.

FIELD

The present technology relates to process of preparing boehmite (AlOOH) and transitional aluminas from flash calcined gibbsite. In particular, the present technology relates to a strontium-catalyzed process for preparing boehmite.

SUMMARY

In one aspect, the present technology provides a strontium-catalyzed process for preparing boehmite that includes combining a strontium material, flash calcined gibbsite, and water to obtain an aqueous suspension; contacting the aqueous suspension with a water soluble carbonate material; and heating the aqueous suspension to a temperature, and for a time, sufficient to form at least about 5 weight percent ("wt,%") of boehmite.

In a related aspect, the present technology provides a boehmite prepared according to the process as described herein in any embodiment.

In another aspect, the present technology provides a process for preparing a transitional alumina that includes: preparing boehmite via a strontium-catalyzed process; the process includes: combining a strontium material, flash calcined gibbsite, and water to obtain an aqueous suspension; contacting the aqueous suspension with a caustic material; and heating the aqueous suspension to a temperature, and for a time, sufficient to form at least about 5 wt. % of boehmite; and calcining the boehmite to form the transitional alumina.

In a related aspect, the present technology provides a transitional alumina that includes $SrAl_2O_4$.

In another related aspect, the present technology provides a composition that includes a boehmite prepared according to strontium-catalyzed process described herein in any embodiment or a transitional alumina prepared according to the process described herein in any embodiment, wherein the composition may be selected from a fluid catalyst cracking (FCC) catalyst, a Y-zeolite, a FCC additive, emissions control material, cobalt catalyst support, steam reforming catalysts, emissions control catalysts, and catalyst supports for various chemical process conversion catalysts.

DETAILED DESCRIPTION

Figures 1, 1A:
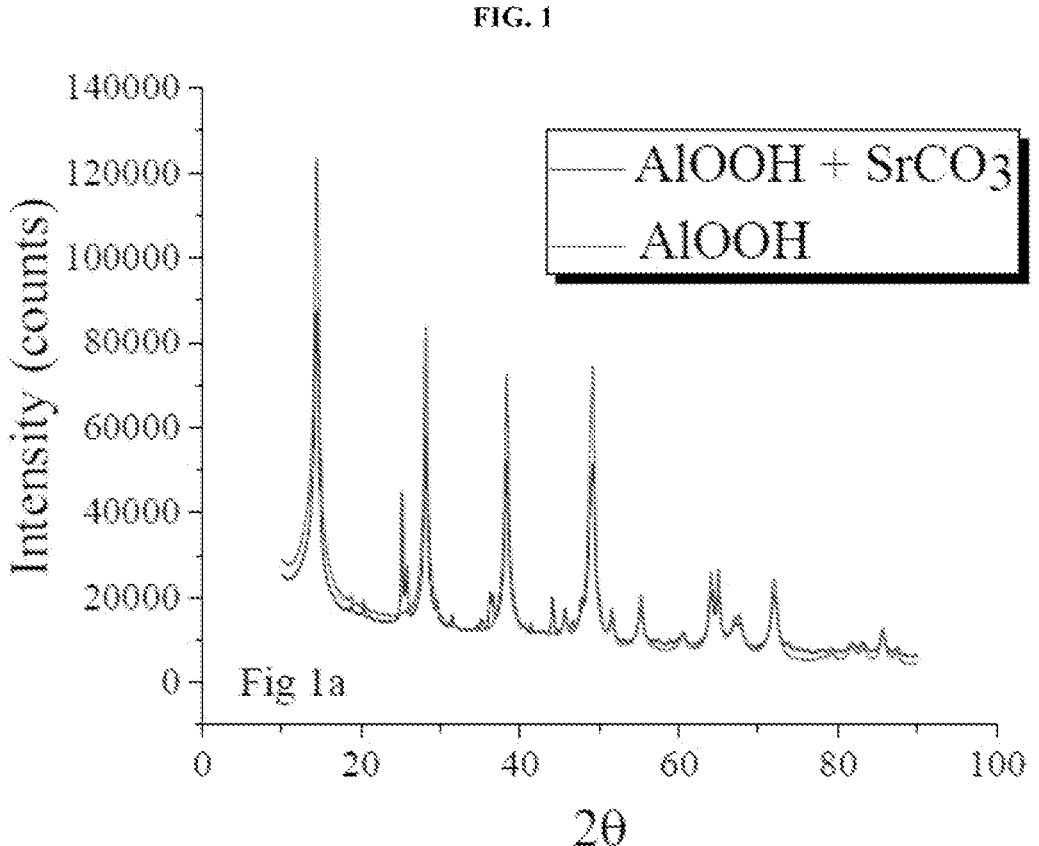
FIG. 1 is an X-ray Diffraction (XRD) pattern of boehmite (AlOOH with $SrCO_3$ and AlOOH alone) prepared according to an exemplar embodiment of the present technology.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The present inventor surprisingly discovered a process for the rapid preparation of undoped boehmite. In the process, strontium compounds have been found to play a catalytic role in the formation of boehmite. As understood by a person of skill in the art, flash calcined gibbsite may be converted to boehmite. As described in more detail herein, the present technology includes converting flash calcined gibbsite in an aqueous suspension in the presence of strontium acetate followed by treating the aqueous suspension with sodium carbonate. Surprisingly, the present inventors discovered that conversion of flash calcined gibbsite to boehmite under the process conditions described herein in any embodiment occurs faster than via conventional routes. The strontium carbonate may then be leached from the boehmite, regenerating strontium acetate solution that may be reused with fresh flash calcined gibbsite to make more boehmite.

In addition, the present inventors discovered that the strontium catalyzed rate of boehmite crystallite size growth is rapid compared to other processes. Without being bound by theory, it is believed that the morphology of the starting gibbsite is suboptimal. Gibbsites often occur as hexagonal plates whose width across the hexagonal basal plane is about 10-40 microns. Gibbsites with a more needle-like morphology are mostly less than 10 μm in diameter, are likely preferred in applications where flash calcined gibbsite (FCG) is hydrated to fine crystalline boehmite. In contrast, the present inventors discovered the boehmite obtained according to the present methods (i.e., strontium-catalyzed direct conversion of FCG to boehmite) have a large crystallite size. Likewise, transitional aluminas (e.g., γ-Al$_2$O$_3$) obtained from such boehmite have a large crystallite size. Large crystal γ-Al$_2$O$_3$ may be useful in a variety of settings. However, obtaining such large crystal aluminas using conventional methods, such as autoclave methods, are often expensive. The presently claimed methods are advantageous over conventional methods because they employ atmospheric conditions.

Strontium-catalyzed boehmite synthesis from flash calcined gibbsite has several additional advantages. First, the process is faster than conventional processes for making undoped boehmite, such as the low-high pH swing method. In that comparative process, an acid such as acetic acid is added to flash calcined gibbsite to drop the pH of the flash calcined gibbsite containing suspension to the range of 3-4 prior to addition of sodium carbonate to raise pH to 9. In both cases, crystallization proceeds at 99° C. For the Sr-catalyzed process according to the present technology, flash calcined gibbsite conversion to AlOOH is 71.5±3.4% after 48 hours of AlOOH crystallization time at 99° C., but for the low-high pH swing method, flash calcined gibbsite conversion to AlOOH at 48 hours is only 65.4*20%.

Second, levels of strong Lewis acidity provided by the strontium-catalyzed approach are particularly low. After complete conversion to AlOOH and calcination to gamma alumina, the content of strong Lewis sites, as assessed by pyridine FTIR, is as low as about 10 μmol/g to about 25 μmol/g. The present inventors surprisingly discovered that the acidity levels remain low when strontium is present in the composite material.

In one aspect, the present technology provides a strontium-catalyzed process for preparing boehmite that includes combining a strontium material, flash calcined gibbsite, and water to obtain an aqueous suspension; contacting the aqueous suspension with a water soluble carbonate material; and heating the aqueous suspension to a temperature, and for a time, sufficient to form at least about 5 weight percent ("wt. %") of boehmite based on total weight of solids.

In any embodiment disclosed herein, the strontium material may include a strontium salt. For example, in any embodiment herein, the strontium salt may include, but is not limited, strontium carboxylate, strontium nitrate, strontium chloride, strontium bromide, strontium iodide, or mixtures thereof. In any embodiment disclosed herein, the strontium material may be a strontium carboxylate salt. Suitable strontium carboxylate salts may include, but are not limited to, strontium acetate, strontium formate, strontium lactate, strontium glycolate, strontium propionate, or mixtures thereof. In any embodiment disclosed herein, the strontium material may be strontium acetate.

In any embodiment disclosed herein, the water soluble carbonate material may include, but is not limited to, a carbonate salt, a carbonate precursor, sodium bicarbonate, sodium ammonium carbonate, or combinations of two or more thereof. For example, in any embodiment disclosed herein, the carbonate salt may include, but is not limited to, sodium carbonate, potassium carbonate, ammonium carbonate, or combinations of two or more thereof. In some embodiments, the carbonate salt may be sodium carbonate. As described herein, the "carbonate precursor" refers to a composition that decomposes to produce a carbonate salt. For example, in any embodiment disclosed herein, the carbonate precursor may be urea.

The aqueous suspension, in any embodiment disclosed here, may include the strontium material and the flash calcined gibbsite in a weight ratio (strontium material:flash calcined gibbsite) from about 10:1 to about 1:10. Suitable weight ratios of the strontium material to the flash calcined gibbsite may include about 10:1, about 5:1, about 3:2, about 2:1, about 1:1, about 1:2, about 2:3, about 1:5, about 1:10, or any range including and/or in between any two of these values. In any embodiment disclosed here, the strontium material may be present in the aqueous suspension in an amount (i.e., a concentration) below the saturation point of the strontium material in solution. For example, in any embodiment disclosed herein, the strontium material may be present in the aqueous suspension at a concentration that is below the saturation point of the strontium material and at a temperature that may be between ambient temperature to about 110° C.

In any embodiment disclosed herein, the aqueous suspension may include about 1 wt. % to about 40 wt. % solids. For example, in any embodiment disclosed herein, the aqueous suspension may include about 1 wt. %, about 2 wt,%, about 3 wt. %, about 4 wt. %, about 5 wt. %, about 6 wt. %, about 7 wt. %, about 8 wt. %, about 9 wt. %, about 10 wt./, about 12 wt. %, about 14 wt. %, about 16 wt. %, about 18 wt. %, about 20 wt. %, about 22 wt. %, about 24 wt. %, about 26 w. %, about 28 wt. %, about 30 wt. %, about 32 wt. %, about 34 wt. %, about 36 wt. %, about 38 wt. %, about 40 wt. %, or any range including and/or in between any two of these values. In any embodiment disclosed herein, the aqueous suspension may include about 1 wt. % to about 40 wt. %, about 10 wt. % to about 30 wt. %, about 15 wt. % to about 25 wt. % solids, or any range including and/or in between any two of the preceding values.

In any embodiment disclosed herein, the process may further include heating the aqueous suspension to a temperature of about 30° C. to about 110° C. prior to contacting the aqueous suspension with the caustic material. Suitable temperatures include, but are not limited to, about 30° C., about 35° C., about 40° C., about 45° C., about 50° C., about 55° C., about 60° C. about 65° C. about 70° C., about 75° C., about 80° C., about 85° C. about 90° C., about 95° C., about 99° C., about 100° C., about 105° C. about 110° C., or any range including and/or in between any two of the preceding values. For example, in any embodiment herein, the temperature may be from about 30° C. to about 110° C., about 45° C. to about 105° C. about 90° C. to about 99° C., about 95° C. to about 100° C., or any range including and/or in between any two of these values.

The heating may take place for a time sufficient to form about 5 wt. % of boehmite based on total weight of solids. For example, the heating may take place for a time sufficient to form about 5 wt,%, about 10 wt. %, about 15 wt. %, about 20 wt,%, about 30 wt. %, about 40 wt./, about 50 wt. %, about 60 wt. %, about 70 wt. %, about 80 wt. %, about 90 wt./, 100 wt. % of boehmite based on total weight of solids, or any range including and/or in between any two of the preceding values. In any embodiment disclosed herein, the heating may occur for a duration of about 1 hour to about 2 weeks. Suitable durations may include, but are not limited to, about 1 hour, about 2 hours, about 4 hours, about 6 hours, about 8 hours, about 10 hours, about 12 hours, about 14 hours, about 16 hours, about 18 hours, about 20 hours, about 22 hours, about 1 day, about 2 days, about 4 days, about 6 days, about 8 days, about 10 days, about 14 days, or any range including and/or in between any two of the preceding values.

5

In any embodiment disclosed herein, the aqueous solution may have a pH of about 7 to about 10. For example, in any embodiment herein, the aqueous solution may have a pH of about 7, about 7.5, about 8, about 8.5, about 9, about 9.5, about 10, or any range including and/or in between any two of these values. In any embodiment disclosed herein, the pH may be about 7 to about 10, about 8 to about 10, about 7.5 to about 9.5, about 8 to about 9.5, about 8.5 to about 9, or any range including and/or in between any two of these values. In any embodiment disclosed herein, the aqueous suspension has a pH of about 7 to about 10. In some embodiments, the pH may be about 9.

In any embodiment disclosed herein, the process may convert the flash calcined gibbsite to boehmite such that at least about 10 wt. % to 100 wt. % of boehmite is formed. For example, in any embodiment herein, at least about 10 wt. %, about 12 wt. %, about 14 wt. %, about 16 wt. %, about 18 wt. about 20 wt. %, about 22 wt. %, about 24 wt. %, about 26 wt,%, about 28 wt. %, about 30 wt. %, about 32 wt. %, about 34 wt. %, about 36 wt. %, about 38 wt. %, about 40 wt. %, about 42 wt. %, about 44 wt. %, about 46 wt. %, about 48 wt. %, about 50 wt. %, about 52 wt. %, about 54 wt. %, about 56 wt. %, about 58 wt. %, about 60 wt. %, about 62 wt. %, about 64 wt. %, about 66 wt. %, about 68 wt. %, about 70 wt. %, about 72 wt. %, about 74 wt. %, about 76 wt. %, about 78 wt. %, about 80 wt. %, about 82 wt. %, about 84 wt. %, about 86 wt. %, about 88 wt. %, about 90 wt. %, about 92 wt. %, about 94 wt. %, about 96 wt. %, about 98 wt. %, 100 wt. %, or any range including and/or in between any two of these values.

The strontium-catalyzed process of the present technology, in any embodiment disclosed herein, may have a faster crystallite size growth rate relative to boehmite formation process that is not strontium-catalyzed. For example, the strontium-catalyzed process may exhibit a faster boehmite crystallite size growth rate relative to uncatalyzed, lanthanum-catalyzed, or bismuth-catalyzed processes.

Once the flash calcined gibbsite is converted to obtain boehmite, the process may further include separating the boehmite from the aqueous suspension and optionally washing. In any embodiment disclosed herein, the process may further include removing the boehmite from the aqueous suspension. For example, in any embodiment disclosed herein, the process may include separating the boehmite from the aqueous suspension. Suitable separation techniques may include, but are not limited to, filtering, evaporation, spray drying, drying via rotary drum dryer, or combinations thereof. In any embodiment disclosed herein, the process may further include washing the boehmite following removal with a wash solution. The washing may be performed to remove sodium from the boehmite. The wash solution, in any embodiment disclosed herein, may be water or an aqueous wash solution. In any embodiment disclosed herein, the wash solution may include an ammonium salt. Suitable ammonium salts may include, but are not limited to, ammonium nitrate, ammonium acetate, or combinations thereof.

In any embodiment disclosed herein, the boehmite obtained from the strontium-catalyzed process of the present technology may have a crystallite size of about 100 Å to about 200 Å, Suitable crystallite sizes may include, but is not limited to, about 100 Å, about 105 Å, about 110 Å, about 115 Å, about 120 Å, about 125 Å, about 130 Å, about 135 Å, about 140 Å, about 145 Å, about 150 Å, about 155 Å, about 160 Å, about 165 Å, about 170 Å, about 175 Å, about 180 Å, about 185 Å, about 190 Å, about 195 Å, about 200 Å, or any range including and/or in between any two of these values. In any embodiment disclosed herein, the crystallite size may be from about 100 Å to about 200 Å, about 105 Å to about 180 Å, about 115 Å to about 160 Å, or any range including and/or in between any two of these values.

The boehmite formed according to the strontium-catalyzed process as disclosed herein in any embodiment may include strontium in the form of strontium carbonate. Additionally or alternatively, in some embodiments, the process of the present technology may further include removing strontium from the boehmite. For example, in any embodiment disclosed herein, removing strontium carbonate from the boehmite may include combining the boehmite with water and weak acid to obtain a reaction mixture; heating the reaction mixture to a temperature, and for a time, to convert the strontium carbonate to a strontium material as disclosed herein in any embodiment; removing the boehmite from the reaction mixture; washing the boehmite with water, and drying the boehmite. In any embodiment disclosed herein, the weak acid may be selected from acetic acid, dilute nitric acid (e.g., about 0.0001 M to less than about 2 M nitric acid), or combinations thereof.

Removing strontium present as strontium carbonate from the boehmite, as disclosed herein in any embodiment, may regenerate the strontium material. For example, combining boehmite that may contain strontium carbonate with acetic acid forms strontium acetate. The strontium acetate recovered during the removing process may be used as the strontium material as disclosed herein in any embodiment.

The boehmite, as disclosed herein in any embodiment, may be an undoped boehmite. Thus, the process may further include doping the boehmite with one or more of a rare earth element, tin or an oxide thereof, bismuth or an oxide thereof, an alkaline earth element, or mixtures of two or more thereof. Suitable rare earth elements may include yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof. In any embodiment disclosed herein, the rare earth element may be lanthanum. Suitable alkaline earth elements may be selected from magnesium, calcium, strontium, or barium. For example, in any embodiment herein, the alkaline earth element may be strontium. In any embodiment disclosed herein, the boehmite may be a strontium-doped boehmite.

In a related aspect, the present technology provides a boehmite prepared according to the process as described herein in any embodiment.

In another aspect, the present technology provides a process for preparing a transitional alumina that includes: (i) preparing belemnite via a strontium-catalyzed process comprising, wherein the strontium-catalyzed process of step (i) that includes: combining a strontium material, flash calcined gibbsite, and water to obtain an aqueous suspension; contacting the aqueous suspension with a caustic material; and heating the aqueous suspension to a temperature, and for a time, sufficient to form at least about 5 wt. % of boehmite based on the total weight of solids; and (ii) calcining the boehmite to form transitional alumina. For example, in any embodiment herein, the boehmite may be obtained via the strontium-catalyzed process as disclosed herein in any embodiment.

In any embodiment disclosed herein, the calcining may be conducted at a temperature from about 500° C. to about 1000° C. Suitable calcination temperature may include, but is not limited to, about 500° C., about 550° C., about 600° C., about 650° C., about 700° C., about 750° C., about 800° C., about 850° C., about 900° C. about 950° C., about 1000°

C., or any range including and/or in between any two of these values. For example, in any embodiment disclosed herein, the calcination temperature may be from about 500° C. to about 1000° C., about 550° C. to about 750° C., about 550° C. to about 650° C., about 750° C. to about 900° C., about 750° C. to about 850° C., or any range including and/or in between any two of these values.

In any embodiment disclosed herein, the transitional alumina may include, but is not limited to, $\gamma$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$), or a combination of two or more thereof. In any embodiment disclosed herein, the transitional alumina may include $\gamma$-alumina, $\chi$-alumina, or a mixture thereof. In any embodiment disclosed herein, the transitional alumina may include $\gamma$-alumina.

The transitional alumina obtained according to the process disclosed herein may have reduced number of Lewis acid sites. In any embodiment disclosed herein, the transitional alumina may have a Lewis acidity of less than or equal to about 120 $\mu$mol/g. For example, in any embodiment disclosed herein, the transitional alumina may have a Lewis acidity of about 120 $\mu$mol/g to about 10 $\mu$mol/g. In any embodiment disclosed herein, the transitional alumina may have a Lewis acidity of about 10 $\mu$mol/g, about 11 $\mu$mol/g, about 12 $\mu$mol/g, about 13 $\mu$mol/g, about 14 $\mu$mol/g, about 15 $\mu$mol/g, about 16 $\mu$mol/g, about 17 $\mu$mol/g, about 18 $\mu$mol/g, about 19 $\mu$mol/g, about 20 $\mu$mol/g, about 25 $\mu$mol/g, about 30 $\mu$mol/g, about 35 $\mu$mol/g, about 40 $\mu$mol/g, about 45 $\mu$mol/g, about 50 $\mu$mol/g, about 55 $\mu$mol/g, about 60 $\mu$mol/g, about 65 $\mu$mol/g, about 70 $\mu$mol/g, about 80 $\mu$mol/g, about 85 $\mu$mol/g, about 90 $\mu$mol/g, about 95 $\mu$mol/g, about 100 $\mu$mol/g, about 105 $\mu$mol/g, about 110 $\mu$mol/g, about 115 $\mu$mol/g, about 120 $\mu$mol/g, or any range including and/or in between any two of these values. In any embodiment disclosed herein, the transitional alumina may have a Lewis acidity of about 10 $\mu$mol/g to about 25 $\mu$mol/g.

In any embodiment disclosed herein, the transitional alumina may include a strontium containing phase. For example, in any embodiment disclosed herein, the strontium-containing phase may include $SrAl_2O_4$. In any embodiment, the $SrAl_2O_4$ may be present in the transitional alumina in an amount of about 1 wt. % to about 16 wt. % based on total weight of the transitional alumina. For example, in any embodiment disclosed herein, the amount of $SrAl_2O_4$ may be about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt. %, about 15.5 wt. %, about 16 wt. %, or any range including and/or in between any two of the preceding values.

In any embodiment disclosed herein, the transitional alumina obtained from the process of the present technology may have a crystallite size of about 100 Å to about 200 Å, Suitable crystallite sizes may include, but is not limited to, about 100 Å, about 105 Å, about 110 Å, about 115 Å, about 120 Å, about 125 Å, about 130 Å, about 135 Å, about 140 Å, about 145 Å, about 150 Å, about 155 Å, about 160 Å, about 165 Å, about 170 Å, about 175 Å, about 180 Å, about 185 Å, about 190 Å, about 195 Å, about 200 Å, or any range including and/or in between any two of these values. In any embodiment disclosed herein, the crystallite size may be from about 100 Å to about 200 Å, about 105 Å to about 180

Å, about 115 Å to about 160 Å, or any range including and/or in between any two of these values.

The transitional alumina obtained according to the process of the present technology may have a surface area of about 120 $m^2$/g to about 200 $m^2$/g. For example, in any embodiment disclosed herein, the surface area may be about 120 $m^2$/g, about 125 $m^2$/g, about 130 $m^2$/g, about 135 $m^2$/g, about 140 $m^2$/g, about 145 $m^2$/g, about 150 $m^2$/g, about 155 $m^2$/g, about 160 $m^2$/g, about 165 $m^2$/g, about 170 $m^2$/g, about 175 $m^2$/g, about 180 $m^2$/g, about 185 m/g, about 190 $m^2$/g, about 195 $m^2$/g, about 200 $m^2$/g, or any range including and/or in between any two of these values. In any embodiment disclosed herein, the transitional alumina may have a surface area of about 120 $m^2$/g to about 200 $m^2$/g, about 150 $m^2$/g to about 180 $m^2$/g, or any range including and/or in between any two of these values.

The transitional alumina formed according to the process as disclosed herein in any embodiment may be a strontium-doped boehmite. Additionally or alternatively, in some embodiments, the process of the present technology may further include removing strontium from the strontium-doped transitional alumina. For example, in any embodiment disclosed herein, removing strontium from the strontium-doped transitional alumina may include combining the strontium-doped transitional alumina with water and acetic acid to obtain a reaction mixture; heating the reaction mixture to a temperature, and for a time, to convert the strontium-doped transitional alumina to an undoped transitional alumina: removing the undoped transitional alumina from the reaction mixture; washing the undoped transitional alumina with water; and drying the undoped transitional alumina.

The transitional alumina, as disclosed herein in any embodiment, may be an undoped transitional alumina. Thus, in any embodiment disclosed herein, the process may further include doping the boehmite with one or more of a rare earth element, tin or an oxide thereof, bismuth or an oxide thereof, an alkaline earth element, or mixtures of two or more thereof. Suitable rare earth elements may include yttrium, scandium, praseodymium, neodymium, promethium, samarium, europium, terbium, dysprosium, holmium, erbium, thulium, lutetium, ytterbium, gadolinium, cerium, lanthanum, or a mixture of any two or more thereof. Suitable alkaline earth elements may be selected from magnesium, calcium, strontium, or barium.

In a related aspect, the present technology provides a transitional alumina that includes $SrAl_2O_4$. In any embodiment disclosed herein, the transitional alumina may include $SrAl_2O_4$ in an amount of about 1 wt. % to about 16 wt. % based on total weight of the transitional alumina. For example, in any embodiment disclosed herein, the amount of $SrAl_2O_4$ may be about 1 wt. %, about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt. %, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt. %, about 15.5 wt. %, about 16 wt. %, or any range including and/or in between any two of the preceding values.

In any embodiment disclosed herein, the transitional alumina may include, but is not limited to, $\gamma$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$, or a combination of two or more thereof. In any embodiment disclosed herein, the transitional alumina may include $\gamma$-alumina, $\chi$-alumina, or a mixture thereof. In any embodiment disclosed herein, the transitional alumina may include $\gamma$-alumina.

The transitional alumina obtained according to the process disclosed herein may have reduced number of Lewis acid sites. In any embodiment disclosed herein, the transitional alumina may have a Lewis acidity of less than or equal to about 120 $\mu$mol/g. For example, in any embodiment disclosed herein, the transitional alumina may have a Lewis acidity of about 120 $\mu$mol/g to about 10 $\mu$mol/g. In any embodiment disclosed herein, the transitional alumina may have a Lewis acidity of about 10 $\mu$mol/g, about 11 $\mu$mol/g, about 12 $\mu$mol/g, about 13 $\mu$mol/g, about 14 $\mu$mol/g, about 15 $\mu$mol/g, about 16 $\mu$mol/g, about 17 $\mu$mol/g, about 18 $\mu$mol/g, about 19 $\mu$mol/g, about 20 $\mu$mol/g, about 25 $\mu$mol/g, about 30 $\mu$mol/g, about 35 $\mu$mol/g, about 40 $\mu$mol/g, about 45 $\mu$mol/g, about 50 $\mu$mol/g, about 55 $\mu$mol/g, about 60 $\mu$mol/g, about 65 $\mu$mol/g, about 70 $\mu$mol/g, about 80 $\mu$mol/g, about 85 $\mu$mol/g, about 90 $\mu$mol/g, about 95 $\mu$mol/g, about 100 $\mu$mol/g, about 105 $\mu$mol/g, about 110 $\mu$mol/g, about 115 $\mu$mol/g, about 120 $\mu$mol/g, or any range including and/or in between any two of these values. In any embodiment disclosed herein, the transitional alumina may have a Lewis acidity of about 10 $\mu$mol/g to about 25 $\mu$mol/g.

In any embodiment disclosed herein, the transitional alumina obtained from the process of the present technology may have an average crystallite size of about 100 Å to about 200 Å, Suitable crystallite sizes may include, but is not limited to, about 100 Å, about 105 Å, about 110 Å, about 115 Å, about 120 Å, about 125 Å, about 130 Å, about 135 Å, about 140 Å, about 145 Å, about 150 Å, about 155 Å, about 160 Å, about 165 Å, about 170 Å, about 175 Å, about 18 Å, about 185 Å, about 190 Å, about 195 Å, about 200 Å, or any range including and/or in between any two of these values. In any embodiment disclosed herein, the crystallite size may be from about 100 Å to about 200 Å, about 105 Å to about 18 Å, about 115 Å to about 160 Å, or any range including and/or in between any two of these values. In any embodiment described herein, the average crystallite size refers to crystallite size determined using X-ray diffraction at 120 reflection of boehmite, having a width analyzed according to the Scherrer equation.

The transitional alumina may have a surface area of about 120 m$^2$/g to about 200 m$^2$/g. For example, in any embodiment disclosed herein, the surface area may be about 120 m/g, about 125 m$^2$/g, about 130 m$^2$/g, about 135 m$^2$/g, about 140 m$^2$/g, about 143 m$^2$/g, about 150 m$^2$/g, about 155 m$^2$/g, about 160 m$^2$/g, about 165 m$^2$/g, about 170 m$^2$/g, about 175 m$^2$/g, about 180 m$^2$/g, about 185 m$^2$/g, about 190 m$^2$/g, about 195 m$^2$/g, about 200 m$^2$/g, or any range including and/or in between any two of these values. In any embodiment disclosed herein, the transitional alumina may have a surface area of about 120 in/g to about 200 m$^2$/g, about 150 m$^2$/g to about 180 m$^2$/g, or any range including and/or in between any two of these values.

In another related aspect, the present technology provides a composition that includes a boehmite prepared according to the strontium-catalyzed process described herein in any embodiment, a transitional alumina prepared according to the process described herein in any embodiment, or a transitional alumina as described herein in any embodiment. The composition, as described herein in any embodiment, may be selected from a fluid catalytic cracking (FCC) catalyst, a Y-zeolite, a FCC additive, emissions control material, cobalt catalyst support, steam reforming catalysts, emissions control catalysts, a hydrocracking catalyst, a hydrotreating catalyst, and catalyst supports for various chemical process conversion catalysts. Additionally or alternatively, in some embodiments, the composition may be a catalyst that includes a mixture of Y-zeolite and a boehmite or transitional alumina as described and/or prepared according to any embodiment disclosed herein.

In any embodiment disclosed herein, the composition may include a transitional alumina that includes $SrAl_2O_4$. For example, in any embodiment disclosed herein, the transitional alumina may include $SrAl_{2O4}$ in an amount of about 1 wt. % to about 16 wt. % based on total weight of the transitional alumina. For example, in any embodiment disclosed herein, the amount of $SrAl_2O$ may be about 1 wt. % about 1.5 wt. %, about 2 wt. %, about 2.5 wt. %, about 3 wt. %, about 3.5 wt. %, about 4 wt. %, about 4.5 wt. %, about 5 wt. %, about 5.5 wt. %, about 6 wt. %, about 6.5 wt. %, about 7 wt. %, about 7.5 wt,%, about 8 wt. %, about 8.5 wt. %, about 9 wt. %, about 9.5 wt. %, about 10 wt. %, about 10.5 wt. %, about 11 wt. %, about 11.5 wt. %, about 12 wt. %, about 12.5 wt. %, about 13 wt. %, about 13.5 wt. %, about 14 wt. %, about 14.5 wt. %, about 15 wt. %, about 15.5 wt. %, about 16 wt. %, or any range including and/or in between any two of the preceding values.

In any embodiment disclosed herein, the transitional alumina may include, but is not limited to, $\gamma$-$Al_2O_3$, $\eta$-$Al_2O_3$, $\delta$-$Al_2O_3$, $\theta$-$Al_2O_3$, $\kappa$-$Al_2O_3$, $\chi$-$Al_2O_3$, or a combination of two or more thereof. In any embodiment disclosed herein, the transitional alumina may include $\gamma$-alumina, $\chi$-alumina, or a mixture thereof. In any embodiment disclosed herein, the transitional alumina may include $\gamma$-alumina.

The transitional alumina obtained according to the process disclosed herein may have reduced number of Lewis acid sites. In any embodiment disclosed herein, the transitional alumina may have a Lewis acidity of less than or equal to about 120 $\mu$mol/g. For example, in any embodiment disclosed herein, the transitional alumina may have a Lewis acidity of about 120 $\mu$mol/g to about 10 $\mu$mol/g. In any embodiment disclosed herein, the transitional alumina may have a Lewis acidity of about 10 $\mu$mol/g, about 11 $\mu$mol/g, about 12 $\mu$mol/g, about 13 $\mu$mol/g, about 14 $\mu$mol/g, about 15 $\mu$mol/g, about 16 $\mu$mol/g, about 17 $\mu$mol/g, about 18 $\mu$mol/g, about 19 $\mu$mol/g, about 20 $\mu$mol/g, about 25 $\mu$mol/g, about 30 $\mu$mol/g, about 35 $\mu$mol/g, about 40 $\mu$mol/g, about 45 $\mu$mol/g, about 50 $\mu$mol/g, about 55 $\mu$mol/g, about 60 $\mu$mol/g, about 65 $\mu$mol/g, about 70 $\mu$mol/g, about 80 $\mu$mol/g, about 85 $\mu$mol/g, about 90 $\mu$mol/g, about 95 $\mu$mol/g, about 100 $\mu$mol/g, about 105 $\mu$mol/g, about 110 $\mu$mol/g, about 115 $\mu$mol/g, about 120 $\mu$mol/g, or any range including and/or in between any two of these values. In any embodiment disclosed herein, the transitional alumina may have a Lewis acidity of about 10 $\mu$mol/g to about 25 $\mu$mol/g.

In any embodiment disclosed herein, the transitional alumina obtained from the process of the present technology may have a crystallite size of about 100 Å to about 200 Å, Suitable crystallite sizes may include, but is not limited to, about 100 Å, about 105 Å, about 110 Å, about 115 Å, about 120 Å, about 125 Å, about 130 Å, about 135 Å, about 140 Å, about 145 Å, about 150 Å, about 155 Å, about 160 Å, about 165 Å, about 170 Å, about 175 Å, about 180 Å, about 185 Å, about 190 Å, about 195 Å, about 200 Å, or any range including and/or in between any two of these values. In any embodiment disclosed herein, the crystallite size may be from about 100 Å to about 200 Å, about 105 Å to about 180 Å, about 115 Å to about 160 Å, or any range including and/or in between any two of these values.

The transitional alumina may have a surface area of about 120 m$^2$/g to about 200 m$^2$/g. For example, in any embodiment disclosed herein, the surface area may be about 120 $m^2/g$, about 125 $m^2/g$, about 130 $m^2/g$, about 135 $m^2/g$, about 140 $m^2/g$, about 145 $m^2/g$, about ISO $m^2/g$, about 155 $m^2/g$, about 160 $m^2/g$, about 165 $m^2/g$, about 170 $m^2/g$, about 175 $m^2/g$, about 180 $m^2/g$, about 185 $m^2/g$, about 190 $m^2/g$, about 195 $m^2/g$, about 200 $m^2/g$, or any range including and/or in between any two of these values. In any embodiment disclosed herein, the transitional alumina may have a surface area of about 120 $m^2/g$ to about 200 $m^2/g$, about 150 $m^2/g$ to about 180 $m^2/g$, or any range including and/or in between any two of these values.

The present invention, thus generally described, will be understood more readily by reference to the following examples, which are provided by way of illustration and are not intended to be limiting of the present invention.

EXAMPLES

Example 1: Preparation undoped boehmite (or AlOOH) via strontium-catalyzed process and gamma alumina. Strontium salt (such as strontium acetate or strontium nitrate) was dissolved in water at room temperature. The solution was then heated to 50° C., and flash calcined gibbsite (FCG) was added to obtain a slurry. The slurry was heated to 90° C. at which point sufficient $Na_2CO_3$ was added to raise the pH to 9, and the slurry was then heated to 99° C.

Formation of $SrCO_3$ occurred rapidly and is completed within about one hour. A strontium content of 4 wt. % was measured as SrO-equivalent. At 24 hours, about 50% of the FCG was converted to AlOOH, and after about a week, FCG was completely converted to AlOOH at 99° C.

The resultant AlOOH (boehmite), as described above, was further treated with acetic acid to remove strontium, allowing for recycle of strontium as strontium acetate. Here, a sample of the material (about 20 g) was suspended in about 200 g deionized water, and dilute acetic acid (0.9 g diluted with 50 g water) was added dropwise. After adding the dilute acetic acid, the reaction mixture was heated to 80° C., held with stirring for two hours, and then filtered hot. The filtrate was washed with 100 g of hot deionized water and dried at about 110° C. Steam content during drying was minimal. Analysis of the combined filtrate demonstrated quantitative strontium removal. The XRD pattern (FIG. 1) of the treated solid reveals boehmite (with trace Al(OH)$_3$ phases that were present initially. Diffraction analysis confirms the material was initially a mixture of strontianite. AlOOH, and trace Al(OH) phases (FIG. 1). AlOOH crystallite size (along 120) is the same, within experimental error, before (141 Å) and after (144 Å) strontium removal. Under the conditions of our experiment, the AlOOH did not change. The amorphous, unconverted alumina nutrient also did not detectably change.

Figure 2:
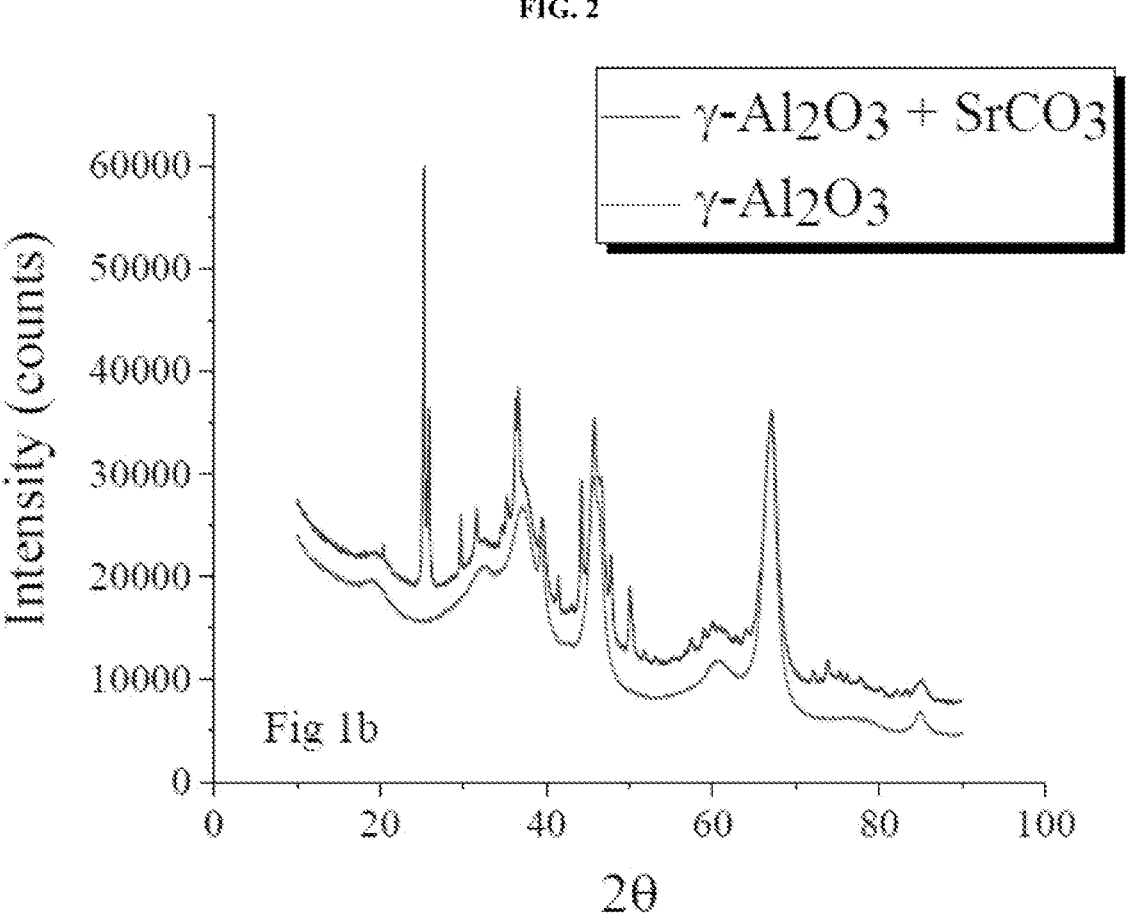
FIG. 2 is an XRD pattern of boehmite ($\gamma$-$Al_2O_3$ with $SrCO_3$ and $\gamma$-$Al_2O_3$ alone) with $SrCO_3$ and AlOOH) prepared according to an exemplar embodiment of the present technology.

When calcined at 600° C., AlOOH transforms to $\gamma$-$Al_2O_3$. $\chi$-$Al_2O_3$ was not detected by X-ray diffraction (XRD). As shown in FIG. 2. $SrCO_3$ remains stable during calcination. In particular, XRD pattern of the resultant transitional aluminas showed $SrCO_3$ did not decompose after calcination at 600° C. When calcined at 800° C., $SrCO_3$ present in the boehmite decomposes, and in addition to transitional aluminas, $SrAl_2O_4$ forms. At 600° C. calcination, the pattern of diffraction intensity in the range of about 30-40° 2θ is consistent with a rather large-crystal $\gamma$-$Al_2O_3$. Without being bound by theory, it is believed that such large crystals occur because the resultant transitional aluminas' parent boehmite, with a crystallite size along 120 of about 143 Å, was relatively large. Indeed, strontium is associated with faster kinetics for crystallite size growth than other systems. Perhaps this is associated with the lower levels of strong Lewis acidity observed for Sr-doped aluminas.

The resultant transitional alumina was further treated with acetic acid to remove strontium as outlined above, leaving behind $\gamma$-$Al_2O_3$ as the only solid phase delectable by XRD. Analysis of the combined filtrate demonstrated quantitative strontium removal (FIG. 2). The surface area of the mixture, prior to $SrCO_3$ removal, was 160 $m^2/g$. After $SrCO_3$ removal, surface area increases to 171 $m^2/g$. $SrCO_3$, associated with narrow diffraction lines, is a dense, low-surface area component of the composite. Its removal results in an increase in surface area of the remainder.

As demonstrated above, the present inventor found that strontium acetate catalyzes the direct FCG hydration to boehmite at pH 9, without formation of bayerite. A mixture of AlOOH and $SrCO_3$ forms. The $SrCO_3$ in the resultant boehmite may be dissolved using acetic acid to recover the water-soluble strontium acetate. This strontium acetate may be used in a subsequent FCG hydration to make, at pH 9 with sodium carbonate, more AlOOH with $SrCO_3$. The process is catalytic in strontium acetate. At 24 hours, AlOOH is much more crystalline in the presence of strontium (140-145 Å diameter) as opposed to lanthanum (90-105 Å) and bismuth (≈50 Å). This leads to larger crystal $\gamma$-$Al_2O_3$.

Example 2: Preparation of Undoped Boehmite Via Strontium-Catalyzed Process and Comparative Lanthanum-Catalyzed Process (Comp. Ex. A).

Boehmite was crystallized as follows: a lanthanum or strontium solution was prepared and heated to 50° C. FCG was added at 50° C. to make a ≈20% solids mixture and the slurry heated to 90° C. At 90° C., sodium carbonate was added in experiments where AlOOH was grown at pH 9. The slurry was heated to 99° C.; the reaction is deemed to start when T=99° C., and AlOOH crystallization proceeds.

Figures 3, 4:
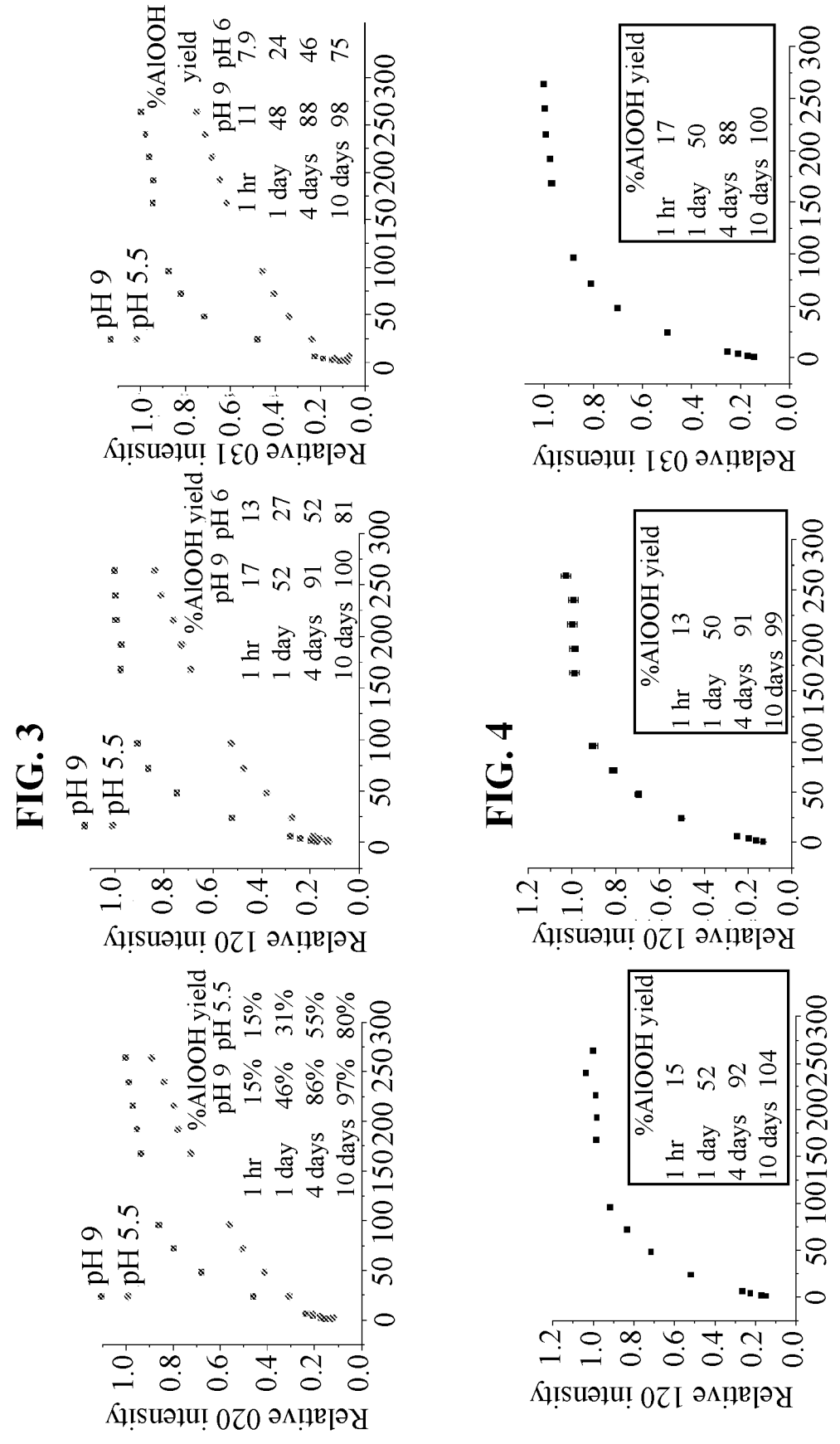
FIG. 3 is a plot showing the fraction conversion to AlOOH in La-doped flash calcined gibbsite crystallizations conducted at pH 5.5 and 9 (Comp. Ex. A).
FIG. 4 is a plot showing the fraction conversion to AlOOH in Sr-doped flash calcined gibbsite crystallizations conducted at pH 9.

Three XRD reflections, the 020, 120, and 031, were evaluated for AlOOH crystallizations run in the presence of lanthanum nitrate at pH 5.5 and 9, and also with strontium acetate/sodium carbonate at pH 9. For pH 9 La— and Sr-doped AlOOH crystallizations, intensities become constant after about 168 hours. Complete conversion to AlOOH occurs, at pH 9, between 96 and 168 hours. Fractional conversion to AlOOH, using these results, are shown in FIG. 3 (for lanthanum; Comp. Ex. A) and FIG. 4 (for strontium). Rate of AlOOH formation is similar at pH 9 in presence of lanthanum and strontium salts. While not being bound by theory, it is believed that most of the ionic strength is due to a mixture of sodium salts under these conditions. At pH 9, conversion to AlOOH is 10-15% after 1 hour and about 50% after 24 hours. At pH 5.5 for lanthanum-catalyzed process, conversion to AlOOH is about 8% after 1 hour, about 25% after 24 hours, and remains incomplete after 11 days, and the balance of the material is essentially amorphous activated alumina.

Utilizing the Liftshitz, Slyov, and Wagner (LSW) model, crystallite size growth rates were evaluated for the lanthanum- and strontium-catalyzed boehmite formation. LSW model:

$D_t - D_0 = k(t-t_o)^{t/n}$ particle sizes at time t and time=0, k is a rate constant, and n is a parameter between 2 and 4 that describes the nature of the ripening process. When n=2, diffusion of ions at the solution/particle boundary is rate limiting. Diffusion of ions through solution governs rate for n=3 while for n=4 the rate of dissolution of the smaller or less reactive particles governs rate. Since AlOOH was present initially taken at $t_o$=0, the LSW model simplifies the equation to $D_t - D_0 = kt^{t/n}$. The initial AlOOH crystallize size (along the 120 direction) was about 24 Å for all cases analyzed for AlOOH growth at pH 9. As shown in Table 1, the rate constant for AlOOH crystallite size growth is 60% larger with Sr compared to La.

TABLE 1

LSW Model regression parameters for AlOOH crystallite size growth for strontium- and lanthanum-catalyzed process.

| | Example 2 | Comp. Ex. A | |
| --- | --- | --- | --- |
| | Strontium Nitrate | Lanthanum Nitrate | Lanthanum Acetate |
| $D_0$ (Å) | 23.6 ± 2.4 | 26.3 ± 2.0 | 26.9 ± 1.2 |
| k | 25.8 ± 0.8 | 14.7 ± 0.4 | 11.1 ± 0.2 |
| adjusted $r^2$ | 0.995 | 0.995 | 0.998 |
| RSS | 30.3 | 46.06 | 8.83 |

Para. A. A strontium-catalyzed process for preparing boehmite, the process comprising: combining a strontium material, flash calcined gibbsite, and water to obtain an aqueous suspension; contacting the aqueous suspension with a water soluble carbonate material; and heating the aqueous suspension to a temperature and for a time sufficient to form at least about 5 wt. % of boehmite based on total weight of the solids.

Para. B. The process of Para. A, wherein the strontium material comprises strontium acetate, strontium nitrate, strontium chloride, strontium bromide, strontium iodide, or a mixture of any two or more thereof.

Para. C. The process of Pars. A or B, wherein the strontium material comprises strontium acetate.

Para. D. The process of any one of Paras. A-C, wherein the strontium material is present in an amount below the saturation point of the strontium material in the aqueous solution.

Para. E. The process of any one of Paras. A-D, wherein the aqueous suspension comprises about 1 wt. % to about 40 wt. % solids.

Para. F. The process of any one of Paras. A-E, wherein the aqueous suspension comprises about 10 wt. % to about 30 wt. % solids.

Pars. G. The process of any one of Paras. A-F, wherein the aqueous suspension comprises about 15 wt. % to about 25 wt. % solids.

Para. H. The process of any one of Pars. A-G, wherein the process further comprises heating the aqueous suspension to a temperature of about 30° C. to about 110° C. prior to contacting the aqueous suspension with the water soluble carbonate material.

Para. I. The process of Para. H, wherein the temperature is about 45° C. to about 100° C.

Para. J. The process of any one of Paras. A-I, wherein the aqueous solution has a pH1 of about 7 to about 10.

Para. K. The process of any one of Paras. A-J, wherein the pH of the aqueous suspension is about 8 to about 10.

Para. L. The process of any one of Paras. A-K, wherein the pH of the aqueous suspension is about 9.

Para. M. The process of any one of Paras. A-L wherein at least about 10 wt. % to 100 wt. % of boehmite is formed based on the total weight of solids.

Para. N. The process of any one of Paras. A-M, wherein the process has a faster crystallite size growth rate relative to a boehmite formation process that is not strontium-catalyzed.

Para. O. The process of any one of Paras. A-N, wherein the boehmite has a crystallite size of about 100 Å to about 200 Å.

Para. P. The process of Para. O, wherein the crystallite size is about 115 Å to about 160 Å.

Para. Q. The process of any one of Paras. A-P, wherein the boehmite comprises strontium carbonate.

Para. R. The process of any one of Pars. A-Q, wherein the process further comprises removing strontium from the boehmite.

Para. S. The process of Para. R, wherein removing strontium carbonate from the boehmite comprises: combining the boehmite with water and acetic acid to obtain a reaction mixture; heating the reaction mixture to a temperature, and for a time, sufficient to convert the strontium carbonate to strontium acetate; removing the boehmite from the reaction mixture; washing the boehmite with water; and drying the boehmite.

Para. T. The process of any one of Paras. A-P, wherein the boehmite is an undoped boehmite.

Para. U. The process of Para. T, wherein the process further comprises doping the undoped boehmite with one or more of a rare earth element, bismuth, an alkaline earth metal, or mixtures thereof.

Para. V. A boehmite prepared according to the process of any one of Paras. A-U.

Para. W. A process for preparing a transitional alumina, the process comprising: (i) preparing boehmite via a strontium-catalyzed process comprising, wherein the strontium-catalyzed process of step (i) comprises: combining a strontium material, flash calcined gibbsite, and water to obtain an aqueous suspension; and contacting the aqueous suspension with a caustic material; and heating the aqueous suspension to a temperature, and for a time, sufficient to form at least about 5 wt. % of boehmite based on the total weight of solids; and (ii) calcining the boehmite to form transitional alumina.

Para. X. The process of Para. W, wherein the boehmite is obtained via the strontium-catalyzed process according to any one of Para. A-U.

Para. Y. The process of Pars. W or X, wherein the calcining is conducted at a temperature from about 500° C. to about 1000° C.

Para. Z. The process of any one of Paras. W-Y, wherein the calcining temperature is about 550° C. to about 750° C.

Para. AA. The process of Para. Z, wherein the calcining temperature is about 550° C. to about 650° C.

Para. AB. The process of any one of Paras. W-Y, wherein the calcining temperature is about 750° C. to about 900° C.

Pan. AC. The process of Para. AB, wherein the calcining temperature is about 750° C. to about 850° C.

Para. AD. The process of any one of Paras. W-AC, wherein the transitional alumina comprises γ-alumina, χ-alumina, or a mixture thereof.

Para. AE. The process of any one of Paras. W-AD, wherein the transitional alumina is γ-alumina.

Para. AF. The process of any one of Paras. W-AE, wherein the transitional alumina has a Lewis acidity of less than or equal to about 120 μmol/g.

Para. AG. The process of Para. AF, wherein the transitional alumina has a Lewis acidity of about 120 μmol/g to about 10 μmol/g.

Para. AH. The process of Par. AF, wherein the transitional alumina has a Lewis acidity of about 25 μmol/g to about 10 μmol/g.

Para. AI. The process of any one of Paras. W-AH, wherein the transitional alumina comprises $SrAl_2O_4$.

Para. AJ. The process of any one of Paras. W-AI, wherein the transitional alumina has a crystallite size of about 100 Å to about 200 Å.

Para. AK. The process of Para. AJ, wherein the crystallite size is about 115 Å to about 160 Å.

Par. AL. The process of any one of Paras. W-AK, wherein the transitional alumina has a surface area of about 120 m$^2$/g to about 200 m$^2$/g.

Para. AM. The process of Para. AL, wherein the transitional alumina has a surface area of about 150 m$^2$/g to about 180 m$^2$/g.

Para. AN. The process of any one of Paras. W-AM, wherein the transitional alumina is a strontium-doped transitional alumina.

Para. AO. The process of any one of Paras. W-AN, wherein the process further comprises removing strontium from the transitional alumina.

Para. AP. The process of Para. AO, wherein the transitional alumina is an undoped transitional alumina.

Para. AQ. The process of Para. AP, wherein the process further comprises doping the undoped transitional alumina with one or more of a rare earth element, bismuth, an alkaline earth metal, or mixtures thereof.

Para. AR. A transitional alumina comprising SrAl$_2$O$_4$.

Para. AS. The transitional alumina of Para. AR, wherein the SrAl$_2$O$_4$ is present in an amount of about 1 wt. % to about 16 wt. %.

Para. AT. The transitional alumina of Para. AR or AS further comprising γ-alumina, χ-alumina, or a mixture thereof.

Para. AU. The transitional alumina of any one of Pares. AR-AT, wherein the transitional alumina has a Lewis acidity of less than or equal to about 120 μmol/g.

Para. AV. The transitional alumina of Para. AU, wherein the transitional alumina has a Lewis acidity of about 25 μmol/g to about 10 μmol/g.

Para. AW. The transitional alumina of any one of Paras. AR-AV, wherein the transitional alumina has a crystallite size of about 100 Å to about 200 Å.

Para. AX. The transitional alumina of any one of Paras. AR-AW, wherein the transitional alumina has a surface area of about 120 m$^2$/g to about 200 m$^2$/g.

Part. AY. A composition comprising a boehmite prepared according to any one of Pares. A-U, a transitional alumina prepared according to any one of Pans. W-AQ, or a transitional alumina according to any one of Paras. AR-AX, wherein the composition is selected from a fluid catalyst cracking (FCC) catalyst, a Y-zeolite, a FCC additive, emissions control material, cobalt catalyst support, a Y-zeolite, a FCC additive, emissions control material, cobalt catalyst support, steam reforming catalysts, emissions control catalysts, hydrocracking catalyst, hydrotreating catalyst, and catalyst supports for various chemical process conversion catalysts.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A strontium-catalyzed process for preparing boehmite, the process comprising:

combining a strontium material, flash calcined gibbsite, and water to obtain an aqueous suspension;

contacting the aqueous suspension with a water soluble carbonate material; and heating the aqueous suspension to a temperature and for a time sufficient to form at least about 5 wt. % of boehmite based on total weight of the solid;

wherein the process further comprises removing strontium from the boehmite.

2. The process of claim 1, wherein the strontium material comprises strontium carboxylate, strontium nitrate, strontium chloride, strontium bromide, strontium iodide, or a mixture of any two or more thereof.

3. The process of claim 1, wherein the strontium material is present in an amount below the saturation point of the strontium material in the aqueous solution.

4. The process of claim 1, wherein the aqueous suspension comprises about 1 wt. % to about 40 wt. % solids.

5. The process of claim 1, wherein the process further comprises heating the aqueous suspension to a temperature of about 30° C. to about 110° C. prior to contacting the aqueous suspension with the water soluble carbonate material.

6. The process of claim 1, wherein the aqueous solution has a pH of about 7 to about 10.

7. The process of claim 1, wherein at least about 10 wt. % to 100 wt. % of boehmite is formed based on the total weight of solids.

8. The process of claim 1, wherein the process has a faster crystallite size growth rate relative to a boehmite formation process that is not strontium-catalyzed.

9. The process of claim 1, wherein the boehmite has a crystallite size of about 100 Å to about 200 Å.

10. The process of claim 1, wherein removing strontium from the boehmite comprises: combining the boehmite with water and a weak acid to obtain a reaction mixture; heating the reaction mixture; and removing the boehmite from the reaction mixture.

\*　　\*　　\*　　\*　　\*